(12) United States Patent
Hwang

(10) Patent No.: US 7,697,964 B2
(45) Date of Patent: Apr. 13, 2010

(54) PORTABLE TERMINAL WITH DUAL AXIS HINGE DEVICE

(75) Inventor: Sung-Jun Hwang, Gumi-si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 1008 days.

(21) Appl. No.: 11/399,520

(22) Filed: Apr. 7, 2006

(65) Prior Publication Data
US 2007/0123319 A1 May 31, 2007

(30) Foreign Application Priority Data
Nov. 28, 2005 (KR) ............... 10-2005-0114185

(51) Int. Cl.
*H04M 1/00* (2006.01)
*H04B 1/38* (2006.01)
*H04B 1/034* (2006.01)
(52) U.S. Cl. ............... 455/575.3; 455/90.1; 455/550.1; 455/128
(58) Field of Classification Search ............. 455/575.3, 455/575.1, 550.1, 90.3; 379/433.01
See application file for complete search history.

(56) References Cited

U.S. PATENT DOCUMENTS

| 6,292,980 | B1 * | 9/2001 | Yi et al. ............ 379/434 |
| 7,171,247 | B2 * | 1/2007 | Han ............... 455/575.3 |
| 7,215,981 | B2 * | 5/2007 | Yang ............... 455/575.3 |
| 7,440,783 | B2 * | 10/2008 | Hyun .............. 455/575.3 |
| 7,499,540 | B2 * | 3/2009 | Oliver ............. 379/433.13 |
| 7,526,082 | B2 * | 4/2009 | Abe et al. .......... 379/433.11 |
| 2004/0127266 | A1 * | 7/2004 | Aagaard et al. ...... 455/575.1 |
| 2004/0137970 | A1 * | 7/2004 | Han ............... 455/575.3 |
| 2004/0209645 | A1 * | 10/2004 | Park et al. ........ 455/556.1 |

FOREIGN PATENT DOCUMENTS

| CN | 1649479 | 8/2005 |
| EP | 1 559 859 | 8/2005 |
| JP | 2003-060759 | 2/2003 |
| TW | M242945 | 9/2004 |
| TW | I222824 | 10/2004 |
| TW | M252204 | 12/2004 |
| TW | M268831 | 6/2005 |

* cited by examiner

*Primary Examiner*—Tilahun Gesesse
(74) *Attorney, Agent, or Firm*—Roylance, Abrams, Berdo & Goodman, L.L.P.

(57) ABSTRACT

A portable terminal includes: a first housing; a second housing rotatably connected to the first housing to open or close the housings. A hinge device interconnects the first and second housings. The hinge device provides first and second hinge axes extending perpendicular to each other, wherein the hinge device limits the rotation of the second housing about the second hinge axis when the second housing has been rotated about the hinge axis to the open position, and the hinge device limits the rotation of the second housing about the first hinge axis when the second housing has been rotated to the open position. The portable terminal with the inventive dual axis hinge device is configured in such a way that one housing can be positioned at the top side or lateral side of the other housing, whereby it is convenient to use the portable terminal and it is possible to secure structural stability and reliability.

20 Claims, 9 Drawing Sheets

PORTABLE TERMINAL WITH DUAL AXIS HINGE DEVICE

PRIORITY

This application claims priority to an application entitled "Portable Terminal with Dual Axis Hinge Device" filed with the Korean Intellectual Property Office on Nov. 28, 2005 and accorded Ser. No. 2005-114185, the contents of which are hereby incorporated by reference in its entirety.

BACKGROUND OF THE INVENTION

1. Field of the Invention

The present invention relates to a portable terminal including a cellular phone, a personal digital assistant (PDA), a hand-held phone (HHP), a camera phone, a game phone, an Internet phone, and the like. In particular, the invention relates to a portable terminal with a dual axis hinge device.

2. Description of the Related Art

Typically, the term "portable terminal" means an electronic appliance which enables a user, who carries the portable terminal, to have cordless communication with a counterpart. To increase portability, such portable terminals are being miniaturized, slimmed, narrowed and lightened, and are also tending toward multi-media which can seek various functions. Therefore, it is expected that portable terminals will continue to be miniaturized and made light-weight. The devices will be used multifunctionally and multipurposely, and will be modified to be adaptive for various multimedia and Internet circumstances. In addition, such portable terminals are electronic appliances, which are popularly used by male and female, old and young all over the world and considered as necessities which should be always carried.

Popularized conventional portable terminals are classified into various types depending on external appearance. For example, portable terminals are classified into bar type, flip type and folder type. In addition, portable terminals may be classified into neck wearable type or wrist wearable type depending on the wearing position or method of use. Furthermore, portable terminals may be classified into rotation type or sliding type depending on the opening and closing method. The above mentioned various classification of portable terminals can be readily understood by one having a common knowledge in the art.

In addition, the construction of portable terminals is being improved to be capable of implementing high speed data communication, beyond voice communication. That is, as the desires of consumers increase, high speed data transmission services will be provided which use cordless communication technologies.

At present, conventional portable terminals tend to employ a camera lens to photograph and send a photographed image signal. Popularized portable terminals have an external or internal camera lens module, whereby it becomes possible to perform image communication with a counterpart or to photograph an object.

However, because the external appearance of the conventional portable terminals have been developed on the basis of a shape which is suitable for performing a communication function such as voice communication, message sending or the like, they have a disadvantage in using a multimedia service or the like. For example, because a typical display device for a conventional portable terminal is sized to be larger in the longitudinal direction thereof, it is inconvenient to view a moving image file.

SUMMARY OF THE INVENTION

Accordingly, the present invention solves the above-mentioned problems occurring in the prior art. One object of the present invention is to provide a portable terminal with a dual axis hinge device.

Another object of the present invention is to provide a portable terminal with a dual axis hinge device, which provides two hinge axes so that a housing of the portable terminal can be opened or closed in two directions, thereby enhancing the convenience of a user.

In order to achieve the above-mentioned objects, a portable terminal is provided that includes: a first housing; a second housing rotatably connected to the first housing to be capable of being moved between an open and closed position; and a hinge device for interconnecting the first and second housings, the hinge device providing first and second hinge axes extending perpendicular to each other, wherein the hinge device limits the rotation of the second housing about the second hinge axis when the second housing has been rotated about the first hinge axis to the open position, and the hinge device limits the rotation of the second housing about the first hinge axis when the second housing has been rotated about the second hinge axis to the open position.

These and other salient features of the invention will become apparent from the following detailed description of the invention which in conjunction with the annexed drawings disclose various embodiments of the invention.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE PREFERRED EMBODIMENTS

Hereinafter, preferred embodiments of the present invention will be described with reference to the accompanying drawings. In the following description, a detailed description of known functions and configurations incorporated herein are omitted when unnecessary to clarify the subject matter of the present invention.

Figure 1:
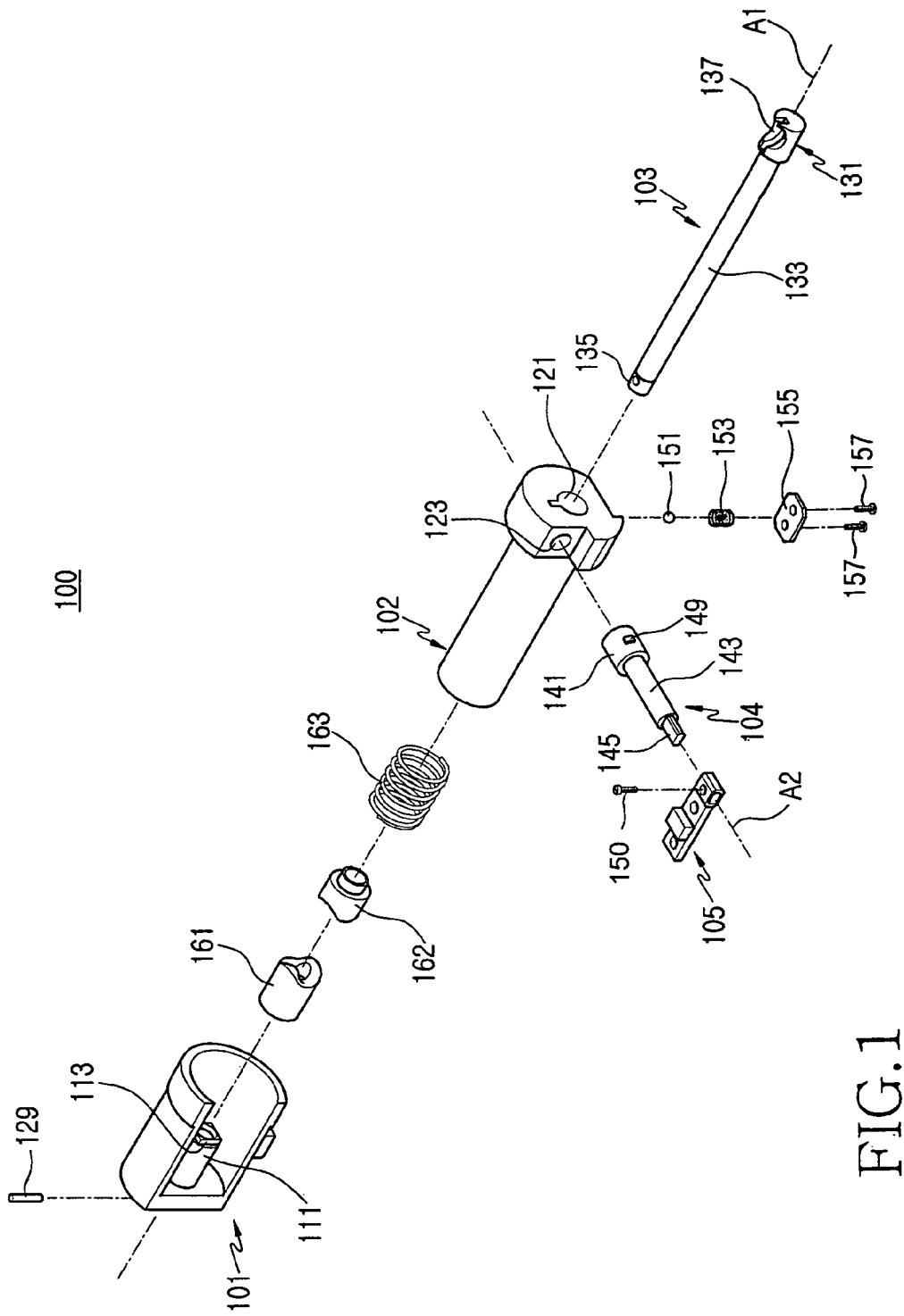
FIG. 1 is an exploded perspective view of a dual axis hinge device of a portable terminal according to an embodiment of the present invention.
Figure 2:
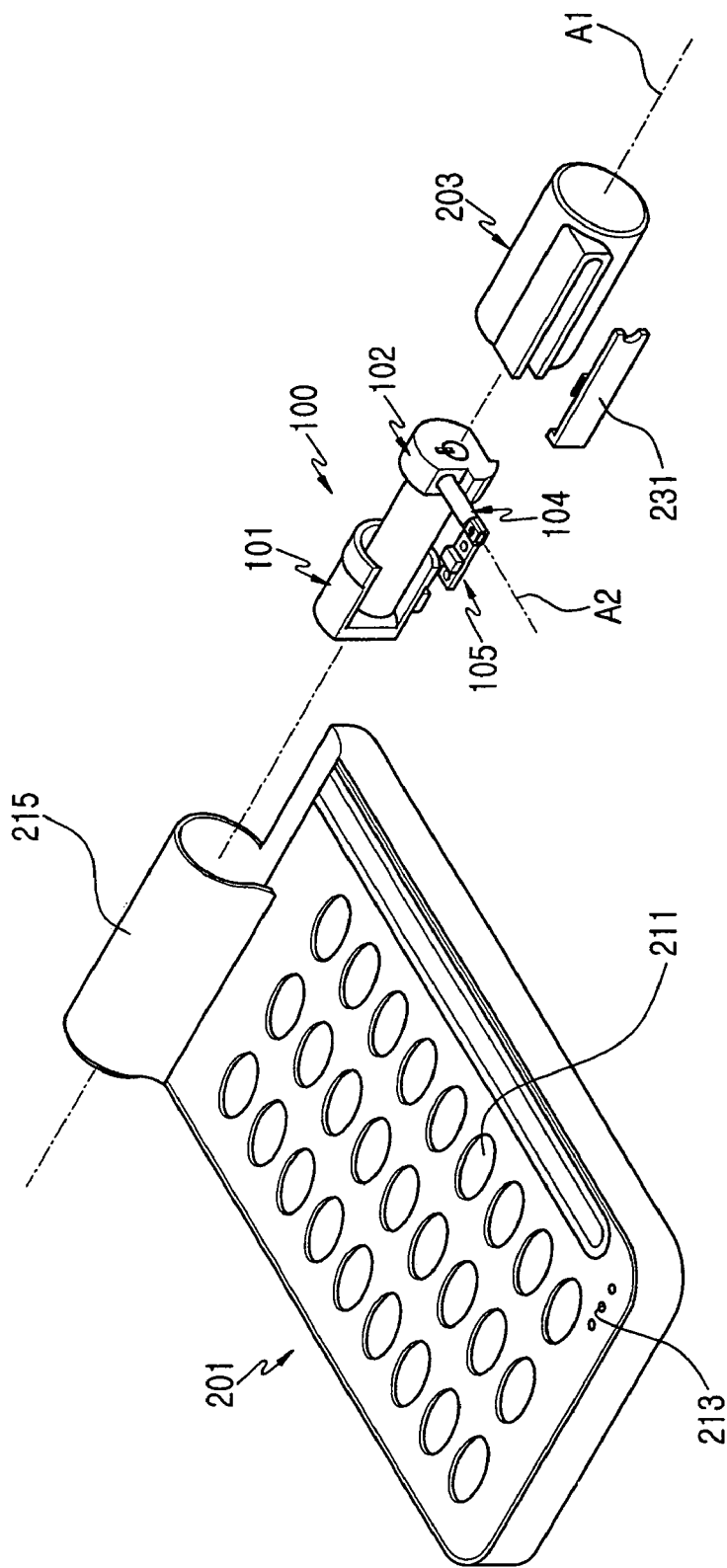
FIG. 2 is an exploded perspective view showing the dual axis hinge device as assembled with a portable terminal.

As shown in FIGS. 1 and 2, a dual axis hinge device 100 for a portable terminal according to an embodiment of the present invention include a first hinge base 101 fixed to a hinge arm 215 of the terminal, a second hinge base 102 which is connected to the first hinge base 101 and is rotatable about a first hinge axis A1. The hinge device also includes a second connection shaft 143 connected to the second hinge base 102 and rotatable about a second hinge axis A2. A first connection shaft 103 connects the second hinge base 102 to the first hinge base 102. The hinge device interconnects a pair of housings 201, 202 of the portable terminals and provides the first and second hinge axes A1 and A2. At this time, when one housing of the terminal is rotated about first or second hinge axis and opened, the hinge device limits the rotation of the one housing about the other hinge axis. As discussed hereinafter, housings 201, 202 pivot about axis A1 from a closed position shown in FIG. 8 to a first open position shown in FIG. 9 and pivot about axis A2 to a second open position shown in FIG. 11. The axis of rotation of the hinge device determines the orientation of the housings 201, 202 with respect to each other.

Figure 9:
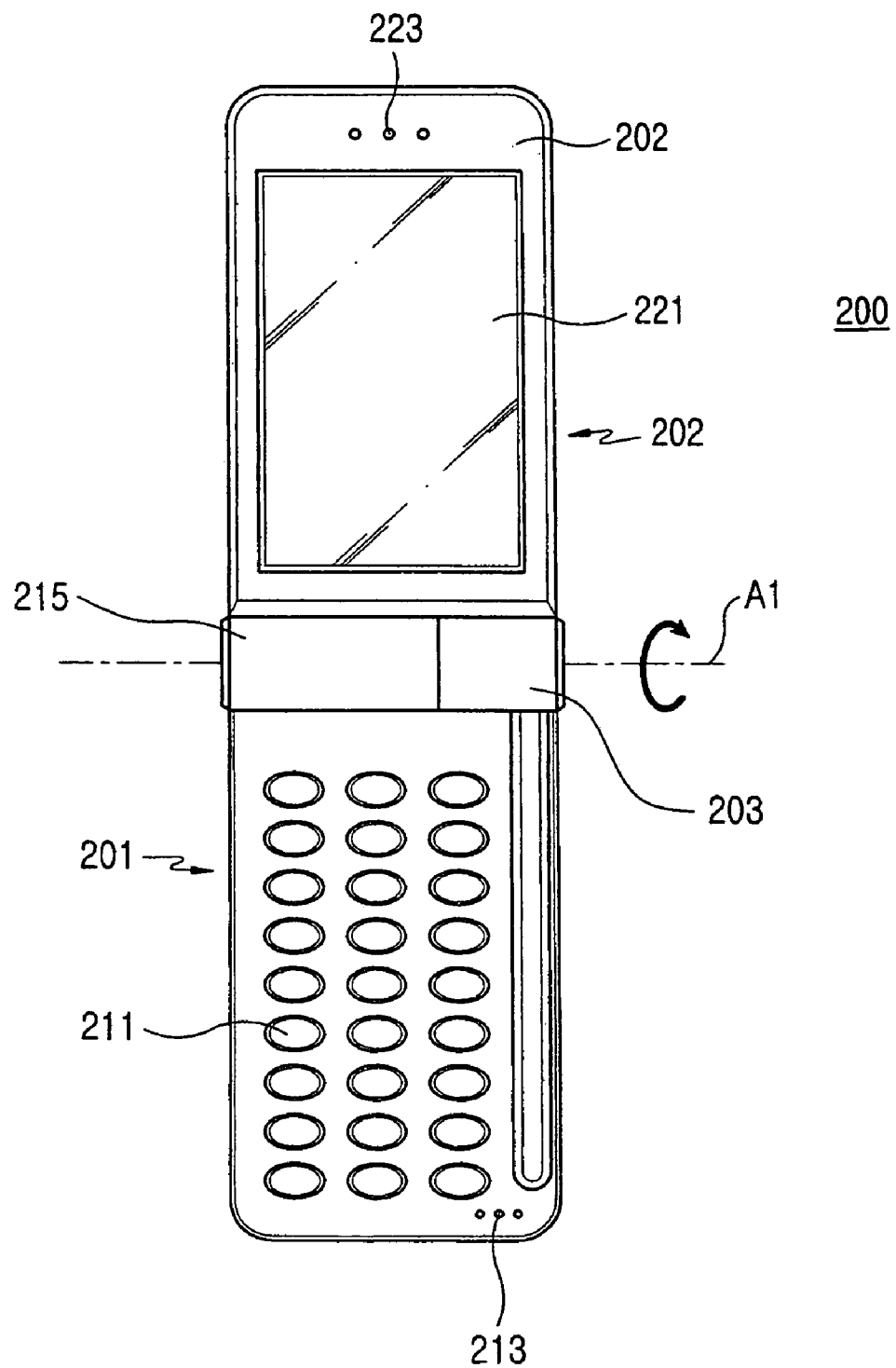
FIG. 9 is a front elevational view of the portable terminal of FIG. 8 where a second housing is rotated about the first hinge axis and fully opened.

The first hinge base 101 is fixed on the first housing 201 of the portable terminal 200 (see FIG. 9). In order to fix the first hinge base 101, a cylindrical hinge arm 215, which is extended in the direction of the first hinge axis A1 is formed in the first housing 201. The first hinge base 101 is received and fixed in the hinge arm 215. The first hinge base 101 is fixed within the hinge arm 215 by a screw or other fastening system as can be easily embodied by one skilled in the art. Therefore, detailed description thereof is omitted.

The first hinge base 101 is formed in a cylindrical shape having a slit. A support 111 extends in the direction of the first hinge axis A1, and is formed on an inner end wall of the first hinge base 101. The support 111 fixedly supports the first connection shaft 103 and one of hinge members 161 and 162 which are received in the second hinge base 102. The support 111 is generally formed in a cylindrical shape, the tip end of which is formed in an angled fixing member 113. The fixing member 113 is formed to fix the hinge member 161 connected to the support 111, so that the hinge member cannot be rotated on the first hinge member 101. The first connection shaft 103 is connected through the support 111, and one of the hinge members 161 and 162 are fitted on the support 111.

The second hinge base 102 extends in the direction of the first hinge axis A1 and is connected to the first hinge base 101, so that the second hinge base 102 is rotatable about the first hinge axis A1. According to a preferred embodiment of the present invention, the second hinge base 102 is rotatably connected to the first hinge base 101 through the first connection shaft 103.

The pair of the hinge members 161 and 162 and spring member 163 are received within the second hinge base 102. The hinge members 161 and 162 and the spring member 163 generate a driving force acting in the rotational direction or in the anti-rotational direction depending on the rotating angle of the second hinge base 102.

The first hinge member 161 is fitted on the support 111 of the first hinge base 101, and a groove (not shown) corresponding in shape to the fixing member 113 are formed in the first hinge member 161. Accordingly, the first hinge member 161 is received in the second hinge base 102 where the first hinge member 161 is fixed to the first hinge base 101. The first hinge member 161 is rotatably received within the second hinge base 102.

The second hinge member 162 is received within the second hinge base 102 in such a way that the second hinge member 162 is linearly movable opposite to the first hinge member 161. The second hinge member 162 is supported by an end of the spring member 163 and is spring biased in the direction in which the second hinge member 162 comes into close contact with the first hinge member 161.

At this time, the first connection shaft 103 sequentially passes through the spring member 163, the second hinge member 162, and the first hinge member while passing through the second hinge base 102, and then the first connection shaft 103 is fixed to the first hinge base 101. Therefore, the spring member 163 is assembled on the peripheral surface of the first connection shaft 103. Specifically, spring member 163 is on a cylindrical part 133 of the shaft and as described later is wound around the cylindrical part 133. The second hinge member 162 is assembled to be linearly movable within the second hinge base 102 and linearly movable and rotatable on the first connection shaft 103. Because the first hinge member 161 and the first connection shaft are both fixed to the first hinge member 101, the first hinge member 161 and the first connection shaft 103 are retained in a stationary position with respect to one another.

The first and second hinge members 161 and 162 are arranged in such a way that a peak part and a valley part formed in one hinge member are opposite to a valley part and a peak part formed in the other hinge member, respectively. The peak part of the first hinge member 161 tends to be retained in the valley part of the second hinge member by the elastic force exerted by the spring member 163. Therefore, if the second hinge base 102 rotates, the second hinge member 162 also rotates in relation to the first hinge member 161, and the peak part of the first hinge member 161 escapes from the valley part of the second hinge member 162. At this time, the biasing force of the spring member 163 is converted into the driving force for rotating the second hinge member 162 with respect to the first hinge member. That is, the second hinge member 162 is rotated in the direction for causing the peak and valley parts of the first and second hinge members 161 and 162 to be engaged with each other. Consequently, the driving force produced by the spring member 163 and the hinge members 161 and 162 acts as the driving force for rotating the second hinge member 102.

If the second hinge member 162 is additionally rotated, and thus the peak part thereof passes the top of the peak part of the first hinge member 161, the biasing force of the spring member 163 is converted into driving force acting in the direction of rotating the second hinge member 162 and the second hinge base 102.

These actions between the spring member and the hinge members can be more easily understood from U.S. Pat. No. 6,292,980, which was filed in the name of the present applicant filed and issued on Sep. 25, 2001.

Figure 3:
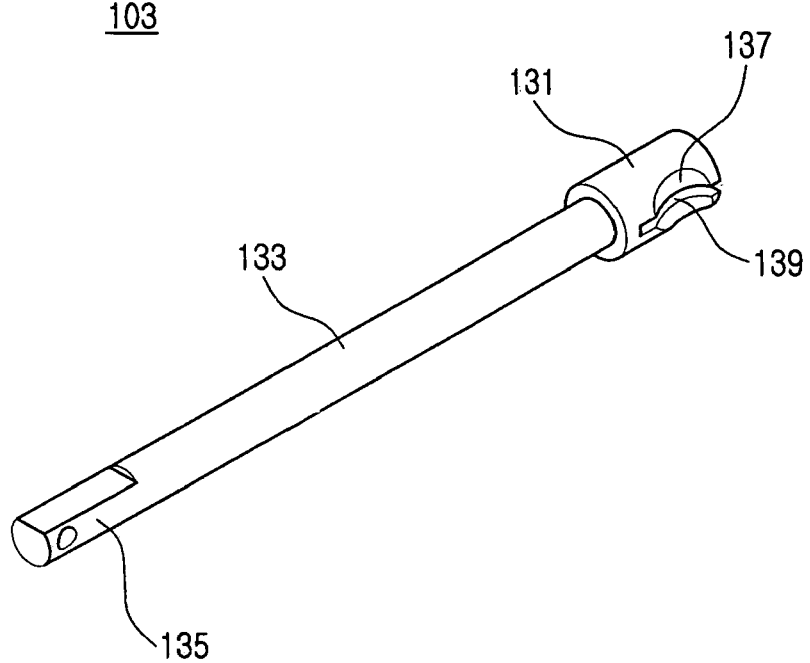
FIG. 3 is a perspective view showing a first connection shaft of the hinge device shown in FIG. 1.

Referring to FIG. 3, the first connection shaft 103 comprises a support part 131 for rotatably supporting the second hinge base 102, a cylindrical part 133 extended from the support 131 in the direction of the first hinge axis A1 through the second hinge base 102, and a fastening part formed at the end of the cylindrical part 133 and fixed to the first hinge base 101. The second hinge base 102 is formed with a support hole 121 for rotatably receiving the support part 131. The support part 131 has a diameter larger than the cylindrical part 133, and a support ridge (not shown) for supporting a stepped part between the support part 131 and the cylindrical part 133 is formed in the support hole 121.

The fastening part 135 passes through the support 111 and projects outward from the end of the first hinge base 101, and a fastening pin 129 as shown in FIG. 1 is fitted into the projecting part of the fastening part 135, whereby the connection shaft 103 is fixed to the first hinge base 101. The first connection shaft 103 is fixed so that it cannot rotate in relation to the first hinge base 101, and the second hinge base 102 is rotated about the first hinge axis A1 while being supported by the first connection shaft 103.

The support part 131 of the first connection shaft 103 is formed with a first escaping groove 137 and a guide groove 139 as shown in FIG. 3. The first escaping groove 137 and the guide groove 139 on the first connection shaft 103 are provided so as to configure a cooperative arrangement between the first connection shaft 103 and the second connection shaft 104 shown in FIGS. 1 and 5. The cooperative arrangement between the first and second connection shafts 103 and 104 will be described below in detail with reference to FIGS. 5 to 7.

The first escaping groove 137 is formed as a curved shape or recess by cutting a part of the support part 131 of the first connection shaft 103. When the first connection shaft 103 and the second connection shaft 104 are joined with the second hinge base 102, the first escaping groove 137 wraps the peripheral surface of the second connection shaft 104. The second connection shaft 104 can be rotated about the second hinge axis A2 only when its peripheral surface is partially wrapped by the first escaping groove 137.

Figure 4:
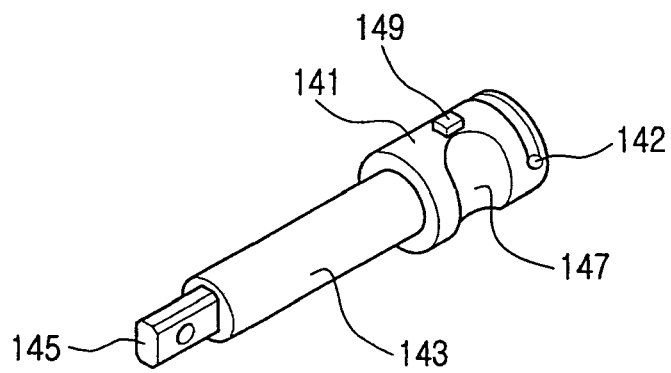
FIG. 4 is a perspective view showing a second connection shaft of the hinge device shown in FIG. 1.

The guide groove 139 is formed on the curved surface of the first escaping groove 137 and extends in the circumferential direction of the first escaping groove 137. The second connection shaft 104 is formed with a projection 149 (see FIG. 4), which is selectively engaged with the guide groove 139 when the second connection shaft 104 rotates about the second hinge shaft A2.

Referring to FIG. 4 again, the second connection shaft 104 comprises a rotating part 141 rotatably received within the second hinge base 102 as shown in FIG. 1, a shaft part 143 extending in the second hinge axis A2 from the rotating part 141, and a fastening part 145 provided at the end of the shaft part 143. The second hinge base 102 is formed with a connection hole 123, which extends in the second hinge axis A2 to receive the rotating part 141.

The peripheral surface of the rotating part 141 is formed with a second escaping groove 147, which is formed by cutting a part of the peripheral surface in a curved shape, and a guide projection 149, projects outward from the peripheral surface of the rotating part 141 adjacent to the second escaping groove 147. If the second connection shaft 104 is assembled to the second hinge base 102, the second escaping groove 147 wraps a part of the peripheral surface of the support part 131 of the shaft 103. In addition, when the second connection shaft 104 is rotated, the guide projection 149 slides in the guide groove 139.

Meanwhile, the peripheral surface of the rotating part of the second connection shaft 104 is formed with a stop groove 142, and the second hinge base 102 is formed with a stop ball 151, which is engaged with the stop groove 142. When the second connection shaft 104 is rotated by a predetermined angle about the second hinge axis A2, the stop groove 142 and the stop ball 151 are engaged with each other, thereby temporarily stopping the rotation and keeping the second connection shaft 104 in the stopped state.

The second hinge base 102 is provided with a coil spring 153 for spring biasing the stop ball 151, and a support plate 155 for supporting the coil spring 153 is fixed to the second hinge base 102 by screws 157. Upon being spring biased by the coil spring 153, the stop ball 151 compresses the peripheral surface of the rotating part 141. Therefore, if the stop ball 151 is positioned opposite to the stop groove 142, the stop ball 151 engages the stop groove 142.

Two or more stop grooves 142 may be formed, which are spaced from each other in the circumferential direction of the peripheral surface of the rotating part 141, and the rotation of the second connection shaft 104 is temporarily stopped at the position where the stop ball 151 is engaged with any of the stop grooves 142.

Figure 8:
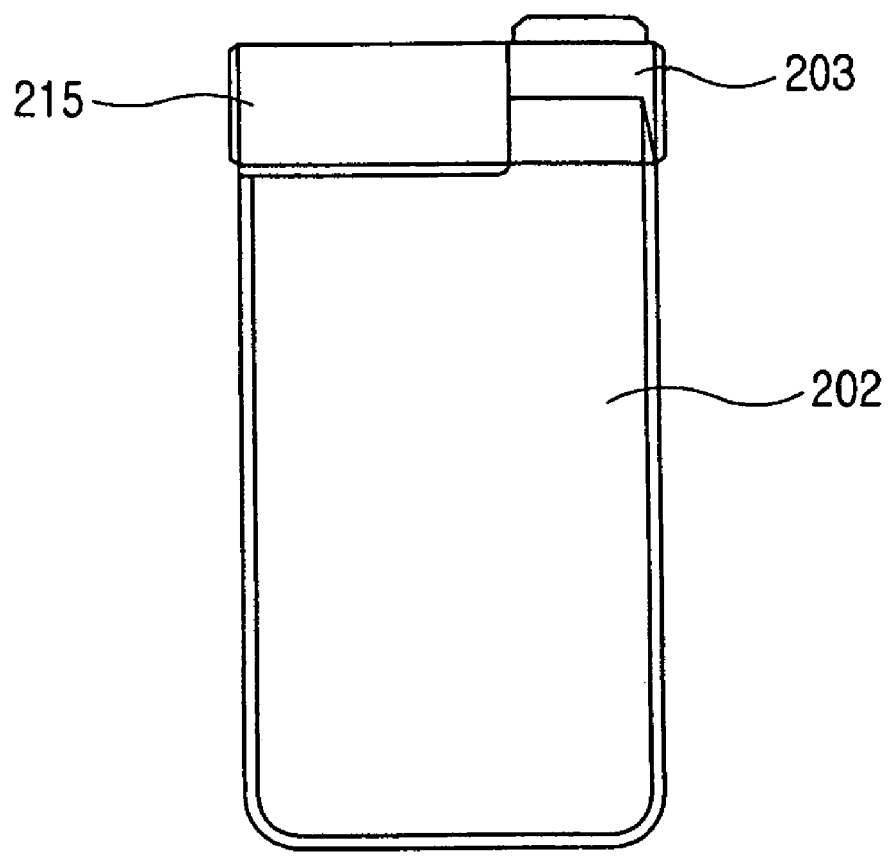
FIG. 8 is a front elevational view of a portable terminal with the hinge device shown in FIG. 1.

The fastening part 145 is provided to mount a second housing 202 of the terminal 200 shown in FIG. 8. In order to secure structural stability when mounting the second housing 202, a fastening piece 105 is provided on the fastening part 145 by a screw 150. As the second housing 202 is mounted on the second connection shaft 104 through the fastening piece 105, the second housing 202 is rotatable about the second hinge axis A2. In addition, as the second hinge base 102 rotates about the first hinge axis A1, the second housing 202 is rotatable about the first hinge axis A1.

Figure 5:
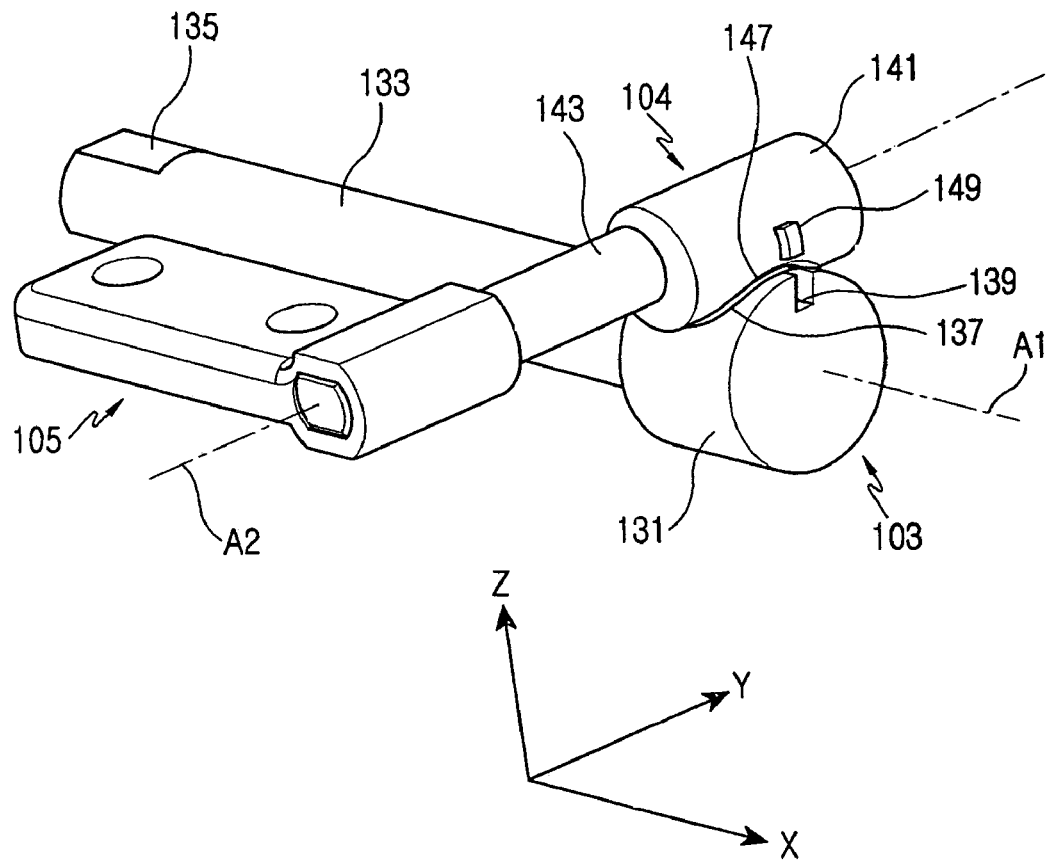
FIG. 5 is a perspective view showing the cooperative relationship between the first and second connection shafts of the hinge device shown in FIG. 1.
Figure 6:
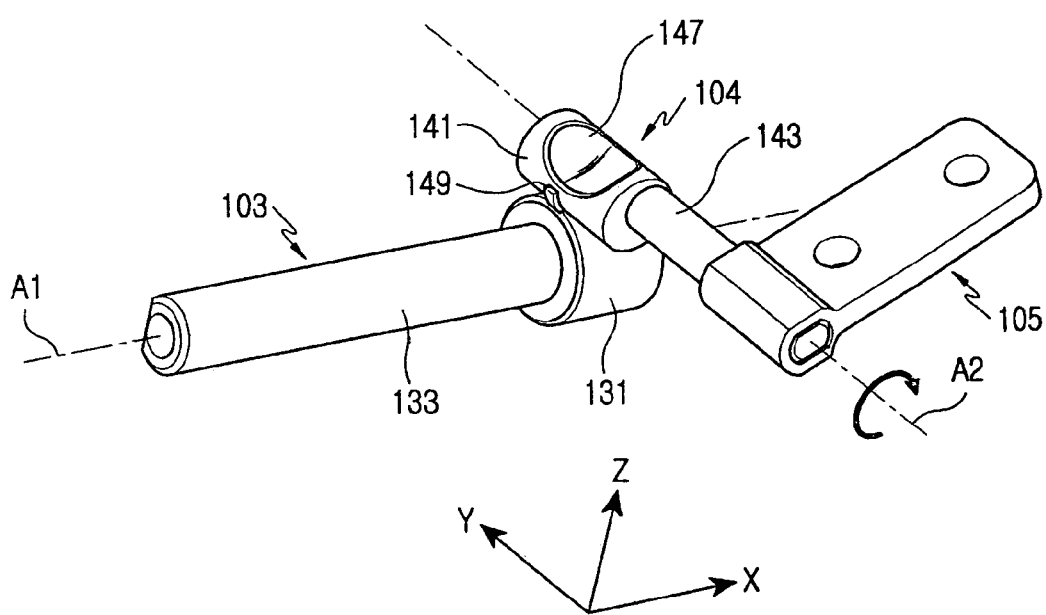
FIG. 6 is a perspective view showing the cooperative relationship where the second connection shaft is rotated about 150 degrees about a second hinge axis from the position shown in FIG. 5.
Figure 7:
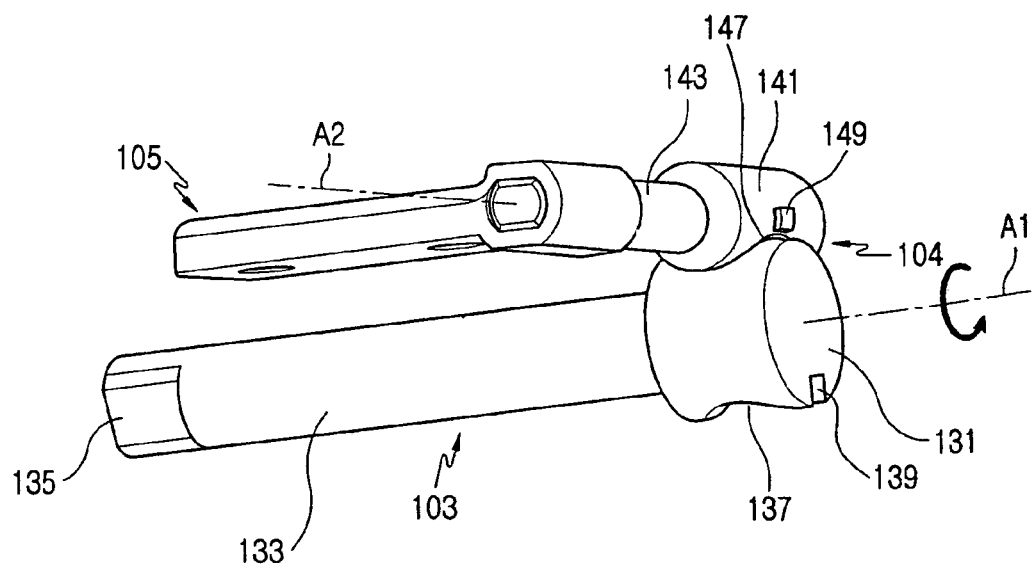
FIG. 7 is a perspective view showing the position of the second hinge base rotated about 150 degrees about a first hinge axis from the position shown in FIG. 5.

The cooperative arrangement between the first connection shaft 103 and the second connection shaft 104 is described with reference to FIGS. 5 to 7. As shown in FIGS. 5 to 7, the second hinge axis A2 extends in the direction perpendicular to the first hinge axis A1 from a position spaced from the first hinge axis A1.

If the first and second connection shafts 103 and 104 are assembled to the second hinge base 102, the support part 131 and the rotating part 141 partially interfere with each other. At this time, due to the first and second escaping grooves 137 and 147, the second connection shaft 104 is capable of swiveling around the first hinge axis A1 or rotating about the second hinge axis A2.

FIG. 5 shows the first and second escaping grooves 137 and 147 are engaged with each other. In the position shown in FIG. 5, there is no interference between the first and second connection shafts 103 and 104, so that the second connection shaft 104 is capable of swiveling around the first hinge axis A1 or rotating about the second hinge axis A2. That is, when the first and second escaping grooves 137 and 147 engage each other, the second hinge base 102 is rotatable about the first hinge axis A1, or the second connection shaft 104 is rotatable about the second hinge axis A2.

FIG. 6 shows the second connection shaft 104 rotated about the second hinge axis A2 from the position shown in FIG. 5. If the second connection shaft 104 rotates about the second hinge axis A2, the guide projection 149 engages the guide groove 139, and a part of the peripheral surface of the rotating part 141 is wrapped by the first escaping groove 137.

When the first escaping groove 137 wraps the peripheral surface of the rotating part 141, the rotation of the second hinge base 102 is limited. If the second hinge base 102 rotates about the first hinge axis A1, the second connection shaft 104 also swivels around the first hinge axis A1. However, if the first escaping groove 137 wraps the peripheral surface of the rotating part, the support part 131 and the rotating part 141 interfere with each other, whereby the swivel movement of the second connection shaft 104 around the first hinge axis A1 is limited and the rotation of the second hinge base 102 about the first hinge axis A1 is also limited. In addition, because the guide projection 149 engages the guide groove 137, the rotation of the second hinge base 10 is further limited.

If the stop groove 142 engages the stop ball 151 while the second connection shaft 104 is rotating about the second hinge axis A2, the rotation of the second connection shaft 104 is stopped. If the second connection shaft 104 is rotated by an external force exceeding the biasing force of the coil spring 153, the stop ball 151 is released from the stop groove 142 and the second connection shaft 104 is rotated.

FIG. 7 shows a state in which the second hinge base 102 and shaft 103 rotate about the first hinge axis A1 and the second connection shaft 104 swivels around the first hinge axis A1 from the position shown in FIG. 5. If the hinge base 102 rotates about the hinge axis A1 from the position in which the first and second escaping grooves 137 and 147 engage each other, the second connection shaft 102 swivels around the first hinge axis A1, and the second escaping groove 147 is moved in the circumferential direction of the support part 141 in the state of wrapping the peripheral surface of the support part 141.

If the second hinge base 102 rotates about the first hinge axis A1 and the first and second escaping grooves 137 and 147 are dislodged from the state of being engaged with each other, the rotation of the second connection shaft 104 about the second hinge axis A2 is limited. That is, as shown in FIG. 7, the support part 131 and the rotating part 141 interfere with each other when the second escaping groove 147 wraps the peripheral surface of the support part 131, so that the rotation of the second connection shaft 104 about the second hinge axis A2 is limited.

Consequently, the rotation of the second hinge base 102 about the first hinge axis A1 and the rotation of the second connection shaft 104 about the second hinge axis A2 cannot occur simultaneously. In addition, if the second hinge base 102 rotates about the first hinge axis A1 or the second connection shaft 104 rotates about the second hinge axis A2 from the position in which the first and second escaping grooves 137 and 147 are engaged with each other, the rotation of one of the second hinge base 102 and the second connection shaft 104 is limited.

Meanwhile, when the second housing 202 rotates about one of the first and second hinge axes A1 and A2, the rotation of the second housing 202 about the other hinge axis can be limited merely by the arrangement of the guide groove 139 and the guide projection 149. For example, if the first and second escaping grooves 137 and 147 are not formed but the first and second hinge axes A1 and A2 are spaced from each other to such an extent that the support part 131 and the rotating part 141 do not interfere with each other, the first and second escaping grooves 131 and 141 are not required and the above-mentioned rotation can be limited merely by the arrangement of the guide groove 139 and the guide projection 149.

Now, the configuration of the first and second connection shafts 103 and 104 are described.

If the support part 131 and the rotating part 141 do not interfere with each other, they are arranged in such a way that the guide projection 149 interferes with the peripheral surface of the support part 131 when the second connection shaft 104 has been rotated about the first hinge axis A1. If the second connection shaft 104 rotates about the first hinge axis A1, the second guide projection 149 interferes with the peripheral surface of the support part 131, and the rotation of the second connection shaft 104 about the second hinge axis A2 is limited.

The second connection shaft 104 is arranged in such a way that it can rotate about the second hinge axis A2 only in the position where the guide projection 149 can be introduced into the guide groove 139. Therefore, if the second connection shaft 104 rotates about the second hinge axis A2, the guide projection 149 is positioned within the guide groove 139, whereby the rotation of the second connection shaft 104 about the first hinge axis A1 is limited.

The configuration for limiting the swivel or rotation of the second connection shaft 104 even if the first and second escaping grooves 137 and 147 are not formed as described above can be easily accomplished by one skilled in the art by partially modifying the above-mentioned embodiments of the present invention.

Now, a portable terminal with the above-mentioned hinge device 100 is described with reference to FIGS. 8 to 11.

As described above, the portable terminal 200 comprises first and second housings 201 and 202, wherein the second housing 202 is connected to the first housing 201 through the hinge device 100, so that the second housing 202 is opened or closed above the first housing 201 while being rotated about the first and second hinge axes A1 and A2.

The front face of the first housing 201 is provided with a key pad 211 and a transmitter part 213, and a hinge arm 215 is provided at the top edge of the first housing 201. In addition, the second housing 202 is mounted on a part of the second connection shaft 104 and the fastening piece 105. One surface of the second housing 202 is provided with a display device 221 and a receiver part 223.

At this time, even if the hinge device 100 interconnects the first and second housings 201 and 202, the second hinge base 102 is partially exposed. Referring to FIG. 2, a hinge cover 203 and a cover member 231 are mounted over the exposed part of the hinge device 100, thereby protecting the exposed part.

If the second housing 202 is folded over the first housing 201, the first and second escaping grooves 137 and 147 are engaged with each other. Therefore, the second hinge base 102 is rotatable about the first hinge axis A1 or the second connection shaft 104 is rotatable about the second hinge axis A2.

If the second housing 202 rotates about the first hinge axis A1 as shown in FIG. 9, the second hinge base rotates about the first hinge axis A1 and the second connection shaft 104 swivels around the first hinge axis A1, whereby the second escaping groove 147 moves in the direction of wrapping the peripheral surface of the support part of the first connection shaft 103. Accordingly, the rotation of the second connection shaft 104 about the second hinge axis A2 is limited. Likewise, if the second housing 202 rotates about the first hinge axis A1, the rotation about the second axis A2 is limited.

If the second housing 202 is rotated about the first hinge axis A1 and extended, the second housing 202 is positioned above the top side of the first housing 201, whereby the distance between the transmitter part 213 and the receiver part are maximized to be suitable for voice communication.

Figure 10:
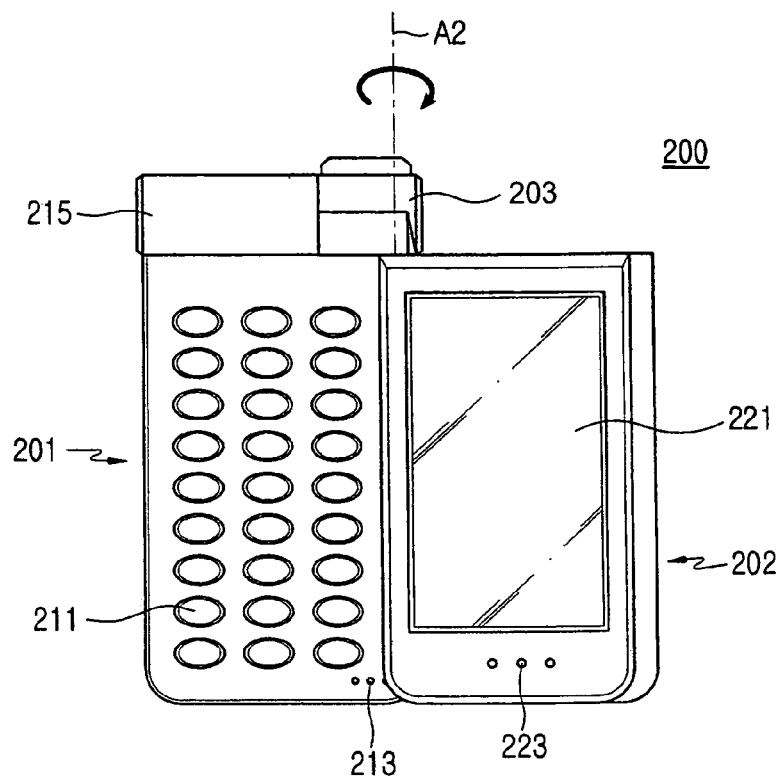
FIG. 10 is a front elevational view of the portable terminal of FIG. 8 where the second housing is rotated about 150 degrees about the second hinge axis.
Figure 11:
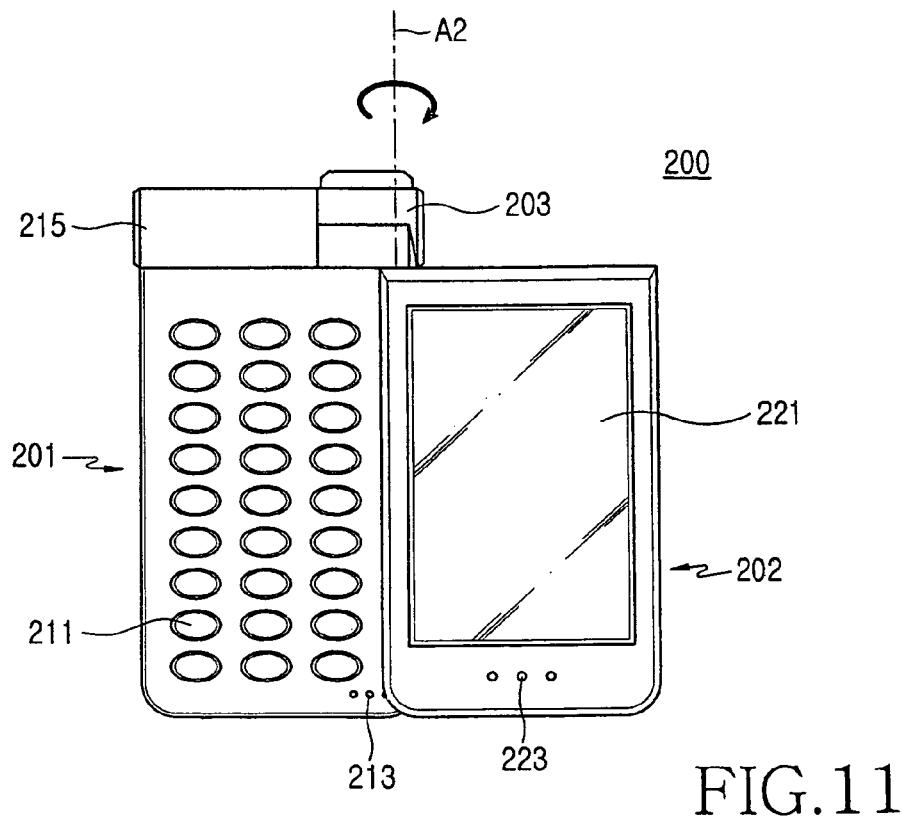
FIG. 11 is a front elevational view of the portable terminal of FIG. 8 where the second housing is rotated about the second axis and fully opened.

FIGS. 10 and 11 show the state in which the second housing 202 is rotated about the second hinge axis A2 from the state of being folded on the first housing 201. More specifically, FIG. 10 shows the second housing 202 in the state in which the second housing 202 has been rotated and stopped so that the second housing 202 is unfolded about 150 to 170 degrees from the first housing 201. FIG. 11 shows the second housing 202 rotated and stopped, so that the second housing 202 is unfolded about 180 degrees.

When the second housing 202 is folded onto the first housing 201, the stop groove 142 and the stop ball 151 are engaged with each other. By the stop groove 142 and the stop ball 151 being engaged with each other, the second housing 202 is stably maintained in the position of being folded on the first housing 201.

Even if the second housing 202 is unfolded about 150 to 170 degrees from the first housing 201, another stop groove (not shown) formed on the second connection shaft 104 and the stop ball 151 are engaged with each other, whereby the second housing 202 is stably maintained in the state in which the rotation of the second housing 202 is stopped. If plural stopper grooves 142 are formed, it will be possible to set the angle selectively to stop the rotation of the second housing 202 when the second housing is unfolded about 150 to 170 degrees from the first housing 201.

When the second housing 202 is extended 180 degrees from the first housing 201 as shown in FIG. 11, the other face of the second housing 202 and the front face of the first housing 201 interfere with each other, thereby limiting the rotation of the second housing 202.

If the second housing is rotated about the second hinge axis A2 as shown in FIG. 10 or FIG. 11, the second housing is located at a lateral side of the first housing 201. At this time, the user positions the terminal 200 crosswise, so that a multimedia file or the like can be viewed through the display device 221. In addition, if the key pad 211 provided on the first housing 201 has a QWERTY key arrangement like a key board arrangement of a personal computer, it is possible to conveniently input various information.

Meanwhile, when the second housing 202 rotates about the second hinge axis A2, the second connection shaft 104 also rotates about the second hinge shaft A2, whereby the rotating part 141 is moved to a position where the peripheral surface of the rotating part 141 is wrapped by the first escaping groove 137. In addition, the guide projection 149 is also moved to a position where the guide projection 149 is engaged with the guide groove 139. Therefore, the second connection shaft 104 and the second hinge base 102 cannot rotate about the first hinge axis A1. Consequently, the second housing 202 rotates about the second hinge axis A2, the rotation about the first hinge axis A1 is limited.

As described above, a portable terminal with the inventive dual axis hinge device has a pair of hinge axes which are extended perpendicular to each other, so that one housing can be positioned at the top side or lateral side of the other housing, whereby it is convenient to use the portable terminal. In addition, when one housing is positioned at the top side or lateral side of the other housing, the rotation of the one housing is limited in any direction, except in the directions of folding the one housing onto the other housing or rotating the one housing away from the other housing, whereby the structural stability and reliability of the terminal can be secured.

While the invention has been shown and described with reference to certain preferred embodiments thereof, various changes and modifications can be made without departing from the scope and spirit of the present invention as defined by the appended claims. Therefore, the scope of the present invention shall be determined by the appended claims and equivalents thereof rather than by the embodiments described above.

What is claimed is:

1. A portable terminal comprising:
   a first housing;
   a second housing rotatably connected to the first housing to be capable of being moved between an open and closed position with respect to the first housing; and
   a hinge device interconnecting the first and second housings, the hinge device providing first and second hinge axes extending perpendicular to each other,
   the hinge device comprising:
   a first hinge base fixed to the first housing;
   a second hinge base extending in a direction of the first hinge axis and connected to the first hinge base so that the second hinge base is rotatable about the first hinge axis with respect to the first hinge base; and
   a second connection shaft connected to the second hinge base so that the second connection shaft is rotatable about the second hinge axis, and
   wherein the second housing is fixed to the second connection shaft, so that as the second hinge base rotates, the second housing is rotated about the first hinge axis to the open position, and as the second connection shaft rotates, the second housing is rotated about the second hinge axis to the open position; and
   wherein the hinge device prevents the rotation of the second housing about the second hinge axis when the second housing has been rotated about the first hinge axis to the open position, and the hinge device prevents the rotation of the second housing about the first hinge axis when the second housing has been rotated about the second hinge axis to the open position.

2. A portable terminal of claim 1, wherein the second hinge axis extends perpendicular to the first hinge axis and is spaced from the first hinge axis.

3. A portable terminal of claim 1, further comprising a first connection shaft rotatably connected through the second hinge base and fixed to the first hinge base.

4. A portable terminal of claim 3, wherein the first connection shaft comprises:
   a support part rotatably supported by the second hinge base;
   a rod-shaped cylindrical part extending from the support part through the second hinge base; and
   a fastening part fixed to the first hinge base.

5. A portable terminal of claim 4, wherein the hinge device further comprises a first escaping groove in a curved shape formed by cutting a part of the peripheral surface of the support part.

6. A portable terminal of claim 5, wherein the hinge device further comprises a guide groove in a slit form along a circumferential direction of the first escaping groove.

7. A portable terminal of claim 1, wherein the hinge device further comprises:
   a first hinge member fixed to the first hinge base and rotatably received in the second hinge base;
   a second hinge member received in the second hinge base and being linearly movable and opposite to the first hinge member; and
   a spring member received in the second hinge base, wherein the spring member provides biasing force acting in the direction in which the second hinge member comes into close contact with the first hinge member.

8. A portable terminal of claim 7, wherein the hinge device further comprises a first connection shaft rotatably connected through the second hinge base in the direction of the first hinge axis and fixed to the first hinge base, the first connection shaft sequentially passing through the spring member, the second hinge base, and the first hinge base.

9. A portable terminal of claim 1, wherein a connection hole extends in the direction of the second hinge axis, is formed at one end of the second hinge base, and the second connection shaft is rotatably fitted in the connection hole.

10. A portable terminal of claim 9, wherein the second connection shaft comprises:
    a rotating part which rotates within the connection hole;
    a shaft part extending in the direction of the second hinge axis from the rotating part; and
    a fastening part provided at an end of the shaft part.

11. A portable terminal of claim 10, wherein the hinge device further comprises a fastening piece fixed to an end of the fastening part.

12. A portable terminal of claim 10, wherein the hinge device further comprises a second escaping groove in a curved shave formed by cutting a part of the peripheral surface of the rotating part.

13. A portable terminal of claim 10, wherein the hinge device further comprises a guide projection projecting from the peripheral surface of the rotating part.

14. A portable terminal of claim 10, wherein the hinge device further comprises:
at least one stop groove formed on the peripheral surface of the rotating part;
a stop ball received in the second hinge base; and
a coil spring for elastically biasing the stop ball, wherein the stop ball is selectively engaged with the stop groove when rotated on the hinge base.

15. A portable terminal of claim 1, wherein the hinge device further comprises: a first connection shaft rotatably connected through the second hinge base along the direction of the first hinge axis and fixed to the first hinge base, wherein one end of the first connection shaft is positioned adjacent to one end of the second connection shaft.

16. A portable terminal of claim 15, wherein the hinge device further comprises: a support part formed at one end of the first connection shaft and supported by one end of the second hinge base; and
a rotating part formed at one end of the second connection shaft and rotatably fitted in the second hinge base, wherein the support part and the rotating body are positioned adjacent each other.

17. A portable terminal of claim 16, wherein the hinge device further comprises:
a first escaping grove in a curved shape formed by cutting a part of the peripheral surface of the support part; and
a second escaping groove in a curved shape formed by cutting a part of the peripheral surface of the rotating part, wherein the first escaping groove is arranged to selectively wrap a part of the peripheral surface of the rotating part and the second escaping groove is arranged to selectively wrap a part of the peripheral surface of the support part.

18. A portable terminal of claim 17, wherein when the first escaping groove is positioned to wrap the peripheral surface of the rotating part, the second connection shaft is rotatable, and when the second escaping groove is positioned to wrap the peripheral surface of the support part, the second hinge base is rotatable.

19. A portable terminal of claim 1, wherein the hinge device further comprises:
a first connection shaft extending in the direction of the first hinge axis and formed with a guide groove on the peripheral surface at one end thereof; and
the second connection shaft extending in the direction of the second hinge axis and formed with a guide projection on the peripheral surface at one end thereof,
wherein when the second housing is rotated about the first hinge axis in relation to the first housing to the open position, the guide projection interferes with the peripheral surface at the one end of the first connection shaft, whereby rotation of the second housing is limited about the second hinge axis, and
wherein when the second housing is rotated about the second hinge axis to the open position, the guide projection is engaged with the guide groove, whereby the rotation of the second housing is limited about the first hinge axis.

20. A portable terminal comprising:
a first housing side edge and a second side edge substantially perpendicular to said first side edge;
a second housing rotatably connected to the first housing and being movable between an open and closed position with respect to the first housing;
a hinge device interconnecting the first and second housings, the hinge device providing a first hinge axis parallel to said first side edge and a second hinge axis extending parallel to said second side edge and perpendicular to said first hinge axis;
the hinge device having a first connection shaft formed with a longitudinal guide groove, and a second connection shaft formed with a guide projection for engaging said longitudinal groove when said second housing is rotated about said second hinge axis, whereby when the second housing is rotated about the first hinge axis in relation to the first housing to the open position, the rotation of the hinge device is prevented about the second hinge axis, and when the second housing is rotated about the second hinge axis to the open position, the guide projection engages the longitudinal groove and prevents rotation of the hinge device about the first hinge axis.

* * * * *